(12) United States Patent
Naude, Jr. et al.

(10) Patent No.: US 7,427,080 B2
(45) Date of Patent: Sep. 23, 2008

(54) SHOPPING TROLLEYS

(75) Inventors: Francois Paulus Naude, Jr., P.O. Box 431, 6570 Knysna (ZA); Eve Marie Luce Jacqueline Lechat, Réunion (FR)

(73) Assignee: Francois Paulus Naude, Jr., Knysna (KE)

( * ) Notice: Subject to any disclaimer, the term of this patent is extended or adjusted under 35 U.S.C. 154(b) by 387 days.

(21) Appl. No.: 10/519,235

(22) PCT Filed: Jun. 27, 2003

(86) PCT No.: PCT/IB03/02512

§ 371 (c)(1),
(2), (4) Date: Aug. 11, 2005

(87) PCT Pub. No.: WO2004/002802

PCT Pub. Date: Jan. 8, 2004

(65) Prior Publication Data

US 2006/0091625 A1    May 4, 2006

(30) Foreign Application Priority Data

Jun. 28, 2002    (ZA)    ................................. 2002/5233

(51) Int. Cl.
*B62B 3/02*    (2006.01)
(52) U.S. Cl. ........................ 280/639; 280/651; 280/47.35
(58) Field of Classification Search ................. 280/639, 280/651, 648, 649, 641, 38, 642, 640, 47.34, 280/79.2, 47.38, 647, 658, 650, DIG. 4, 43.17
See application file for complete search history.

(56) References Cited

U.S. PATENT DOCUMENTS

| | | | | |
|---|---|---|---|---|
| 2,407,385 A | * | 9/1946 | Rubin et al. ................. | 280/641 |
| 2,544,220 A | * | 3/1951 | Concklin ..................... | 280/641 |
| 2,565,820 A | * | 8/1951 | Machanic ..................... | 280/38 |
| 3,082,016 A | * | 3/1963 | Pratt ........................... | 280/641 |
| 3,637,232 A | * | 1/1972 | Bourgraf et al. ............. | 280/641 |
| 5,649,718 A | * | 7/1997 | Groglio ....................... | 280/641 |
| 6,024,527 A | * | 2/2000 | Soriano ....................... | 414/345 |
| 6,045,150 A | * | 4/2000 | Al-Toukhi .................... | 280/641 |
| 6,070,899 A | * | 6/2000 | Gines .......................... | 280/651 |

(Continued)

FOREIGN PATENT DOCUMENTS

DE    196 11 542 A1    9/1997

(Continued)

*Primary Examiner*—Christopher Ellis
*Assistant Examiner*—Bridget Avery
(74) *Attorney, Agent, or Firm*—Fitch, Even, Tabin & Flannery

(57) ABSTRACT

A shopping trolley, which includes a holder for holding articles of shopping, and a wheeled undercarriage connected to the holder. The undercarriage is operable between an erected condition, in which the undercarriage supports the holder at a working height above the ground on wheels, and a collapsed compact condition, for loading of the trolley into a boot of a passenger sedan so that the holder provides a boot organizer. In one embodiment of the invention, the undercarriage comprises a pair of telescopically extendable curved legs, which have wheels mounted thereon. A vehicle, which has a securing arrangement in its boot specifically for securing the collapsible shopping trolley in a stable condition in the boot, when the undercarriage of the trolley is collapsed.

17 Claims, 6 Drawing Sheets

U.S. PATENT DOCUMENTS 6,575,491 B2 * 6/2003 Miller ..................... 280/638
7,080,844 B2 * 7/2006 Espejo ................ 280/33.995

FOREIGN PATENT DOCUMENTS

| DE | 100 50 915 A1 | 4/2002 |
| EP | 0 286 520 | 6/1990 |
| WO | WO 99/06259 | 2/1999 |
| WO | WO 00/74996 A1 | 12/2000 |

* cited by examiner

SHOPPING TROLLEYS

THIS INVENTION relates to shopping trolleys. The invention also relates to a vehicle, and to a vehicle assembly comprising the shopping trolley and a vehicle.

EP 0286 520 provides a shopping trolley which is foldable and is dimensioned to allow storage of the folded trolley in the boot of a vehicle, but can be erected to serve as a suitably sized shopping trolley. WO 99/06259 provides a transport system which comprises a mobile transport device, such as a shopping trolley, which is carried in a larger vehicle, wherein the vehicle has provisions for carrying the transport device.

The invention provides a shopping trolley which includes:
a holder for holding articles of shopping or for holding a basket, tray or bag containing articles of shopping; and
a wheeled undercarriage connected to the holder, the undercarriage being operable between an erected condition, in which the undercarriage supports the holder at a working height above the ground on wheels, and a collapsed compact condition, for loading of the trolley into a boot or trunk of a passenger sedan.

It will be appreciated that the shopping trolley is intended for use with a vehicle, and that the vehicle and the shopping trolley will be shaped for co-operation with each other, particularly during storage of the shopping trolley in the boot of the car when the trolley is in its collapsed condition. The shopping trolley can thus, instead, be seen primarily as a vehicle accessory.

A feature of the trolley, in its collapsed condition, is that it can fit into a boot or trunk of a passenger sedan of average size, to function as a boot or trunk divider or organizer. The trolley may thus, when it is in its collapsed condition and is supported on a floor of a vehicle boot, have a length dimension of 0.5-0.9 m, preferably 0.6-0.8 m, a height dimension of 0.3-0.6 m, preferably 0.4-0.5 m, and a width dimension of 0.3-0.6 m, preferably 0.4-0.5 m.

The shopping trolley may be supportable on a floor of a vehicle boot, when the undercarriage is in its collapsed condition, such that the holder has an orientation relative to the vertical similar to the orientation of the holder when the undercarriage is in its extended condition and supports the holder on the ground, so that the holder provides a boot organizer. Typically, the holder is a shopping basket or tray which faces upwardly when the trolley is collapsed and is supported in the boot, but the holder can be any other arrangement for holding articles of shopping, for instance being a plurality of shopping bags. By holder is thus not only meant a basket, tray, bag, or other container for holding articles of shopping, but also an arrangement or formation for holding a basket, tray, or bag which contains articles of shopping.

The spacing of the holder from the ground surface, when the undercarriage is in its erected condition, will be such that the holder is accessible to a person of average height in normal stance, i.e. it is of normal shopping trolley height, the spacing being greater than 0.4 m, preferably being 0.45-0.6 m. Conveniently, the spacing of the holder from the ground surface, when the undercarriage is in its erected conditions, is variable.

The holder will define a storage space which may conveniently be divided into a number of compartments. In a preferred embodiment, the shopping trolley may include a number of durable shopping bags which are receivable in the storage space of the holder, the bags forming a permanent part of the accessory, being removable from the holder and being intended for repeated use. This is in contrast to conventional more or less disposable shopping bags which are of flexible thin-walled sheet-like plastic material. The bags may thus be of a woven flexible plastics textile material, or the bags may be of a woven natural material.

The bags may be of a substantially liquid-impervious material. In a particular embodiment of the invention, at least some of the bags are divided into separate chambers. At least one of the bags may be insulated to provide thermally insulated storage chambers. Some of the storage chambers may be padded to inhibit damage, in use, of fragile articles, such as glass articles, stored in the storage chambers. Furthermore, partitions which separate the respective storage chambers from one another may be provided with stiffening, to inhibit bruising of articles of produce, such as soft fruit, stored in the storage chambers. Each bag may have a closure mechanism, for example a slide fastener, for openably closing the bags, the bags preferably being liquid-tight when they are closed.

The undercarriage will have a set of wheels such as rollers for engaging the support surface to provide mobility of the undercarriage. In a preferred embodiment, the set of rollers comprises a set of four wheels which are arranged in a rectangular configuration in plan view, when the undercarriage is in its erected condition, each roller being freely swivelable about an associated upright swivel axis. The undercarriage may be sufficiently strong to support a load of at least 50 kg in the holder, when the undercarriage is in its erected condition.

In a particular embodiment of the invention, the undercarriage comprises a pair of elongate curved legs which are part-circular in shape, a set of wheels being mounted on the pair of legs, each leg being slidably mounted on an associated frame-member such that each leg is slidably displaceable between an extended position in which the leg projects from its associated frame member for engagement of the wheels mounted on that leg with the ground, the leg being arranged more or less end-to-end with the associated frame member, and a retracted position in which the leg is retracted relative to its associated frame member. Each leg may thus be telescopically received in the associated frame member, to be telescopically slidable between its extended position and its retracted position, so that, in the retracted position, each leg is located within the associated frame member, each frame member having a part-circular shape corresponding to the shape of the legs, to permit telescopic sliding of the legs in a circumferential direction. The legs and the frame members may be non-circular, typically rectangular, in cross-section, to restrict angular displacement of the legs about their longitudinal directions within the associated frame members.

Conveniently, each leg has mounted thereon a displaceable handle such that, when the leg is in its extended position, the associated handle is located adjacent a rear of the trolley, in its fore-and-aft direction, for gripping by a user, each handle being pivotally displaceable relative to the associated frame member about a pivot axis which extends transversely to the fore-and-aft direction of the trolley in its erected condition, so that, when the leg is in its retracted position, the handle is pivotally displaceable about its pivot axis towards the associated frame member to lie adjacent the frame member. Each handle may conveniently be curved, having a radius of curvature similar to that of the frame members, so that when the handle lies adjacent the associated frame member, it hugs the curve of the frame member.

To permit sliding displacement of each leg in the associated frame member, the frame member will typically be generally tubular, having a longitudinally extending slot through which mounting formations on the log for mounting of the wheels and/or the handles can project and along which said mounting formations are slidable during telescoping of the leg along the frame member.

Each leg may thus have mounted thereon a pair of wheels spaced along the length of the leg, each wheel being spaced from the associated leg by an elongate foot which is pivotally connected at one end thereof to the leg for pivotal displacement about a pivot axis which extends transversely to the fore-and-aft direction of the shopping trolley, the associated wheel being provided at the opposite end of the foot, each foot being pivotally displaceable between a stowed position in which it lies adjacent the associated leg, and an operative position in which it projects transversely from the associated leg, so that the associated wheel is spaced from said leg by the length of the foot for engagement with the ground.

Each part-circular leg and its associated part-circular frame member may, in the erected condition of the undercarriage, lie in a more or less vertical plane and define a gap between their ends at a front of the trolley in the fore-and-aft direction of the shopping trolley, said gap being sufficiently large to straddle a rear portion of an open boot of a passenger sedan when the shopping trolley is wheeled towards the boot of the vehicle, in use, so that part of the legs is receivable in a space between the ground and the rear of the vehicle, the frame members engaging the rear of the vehicle, to rest thereon. This facilitates collapsing of the undercarriage by telescoping retraction of the legs while the remainder of the trolley is supported by resting on the vehicle.

Typically, the radius of curvature of the legs and the frame members is 0.3 m-0.5 m, preferably being about 0.4 m.

Conveniently, the shopping trolley includes an auxiliary holder for holding articles of shopping, the auxiliary holder being removably and replaceably connectable to the legs to extend between the legs when they are in their extended positions, the auxiliary holder additionally serving as a strengthening cross-member between the legs to enhance lateral stability of the undercarriage.

The pair of frame members may conveniently be displaceable relative to each other between an operative condition in which the frame members lie in parallel planes which are laterally spaced apart in a direction transverse to the fore-and-aft direction of the shopping trolley a sufficient distance to permit temporary storage of articles of shopping in a space defined between the frame members, and a fully collapsed condition in which the frame members lie more or less flat against each other. It will be appreciated that the holder will typically be provided between the frame members, and the trolley will thus not be usable as a boot divider or organizer when it is in its fully collapsed condition.

Advantageously, the trolley includes a pair of auxiliary wheels which are respectively mounted on the frame members adjacent ends of the frame members in the fore-and-aft direction of the trolley, such that the auxiliary wheels are engageable with the ground when the extendable legs are in their retracted positions and an end of the trolley opposite the auxiliary wheels is gripped by a user, to permit wheelbarrow-fashion operation of the trolley.

The frame members and the legs may be of a polymeric plastics material, each component being an integral moulding. Instead, the components may be of an extruded metal, such as steel, aluminium, or titanium, or they may be of a composite fibre material, such as carbon fibre or KEVLAR.

The invention also provides a vehicle which includes a body defining a boot, the boot having a securing arrangement specifically for securing a collapsible shopping trolley as defined above in a stable condition in the boot during normal operation of the vehicle, while the undercarriage of the shopping trolley is in its collapsed condition, the securing arrangement being for securing the shopping trolley such that the holder of the shopping trolley has an orientation relative to the vertical similar to is orientation when the undercarriage of the shopping trolley is in its erected condition and supports the holder on the ground.

The securing arrangement may include a depression in a floor of the boot for receiving the shopping trolley with its undercarriage in its collapsed condition, the depression being complementary in outline to a bottom of the shopping trolley in its collapsed condition. Instead, or in addition, the securing arrangement may include fastening means, such as straps, for fastening the trolley in position in the boot.

The invention extends to a vehicle assembly which includes:

a shopping trolley as defined above; and a vehicle as defined above, the shopping trolley being supported with its undercarriage in its collapsed condition on a floor of the boot of the vehicle and being secured in a stable condition by the securing arrangement provided by the vehicle.

In cases where the construction of the shopping trolley comprises a pair of curved extendable legs, as defined above, the rear of the vehicle and the shopping trolley will be shaped for co-operation such that the trolley, when its legs are extended, can straddle the rear of the vehicle when a boot lid is open, to facilitate collapsing and erection of the undercarriage.

The invention will now be further described, by way of example, with reference to the accompanying diagrammatic drawings, in which.

Figure 1:
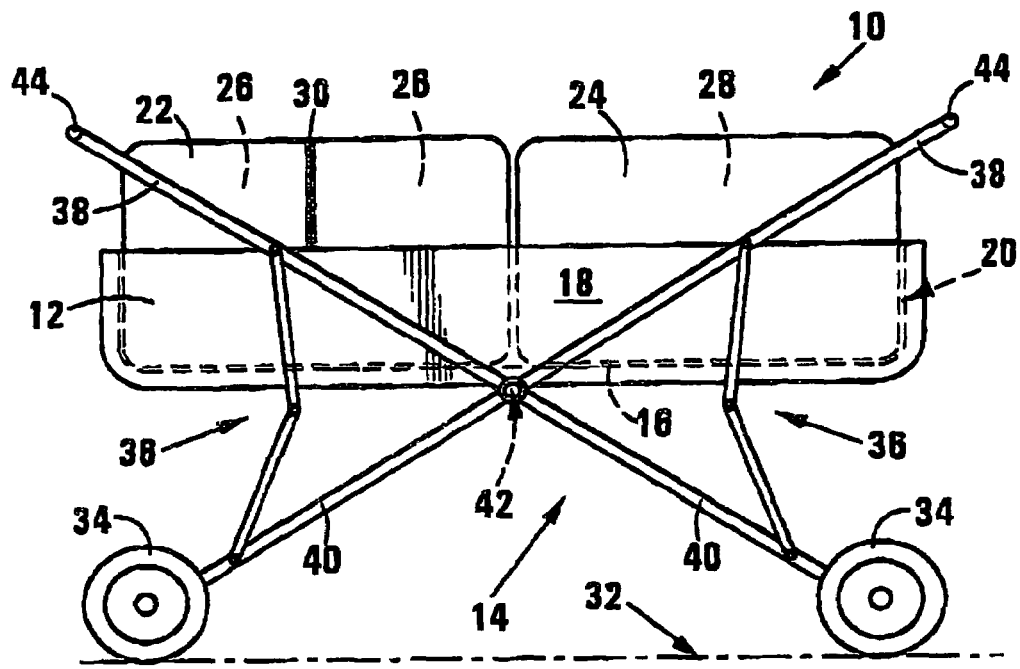
FIG. 1 is a schematic side elevation of a shopping trolley in accordance with the invention, an undercarriage of the shopping trolley being in an erected condition.

In the drawings, reference numeral 10 generally indicates a shopping trolley or vehicle accessory in accordance with the invention. The shopping trolley 10 comprises a holder in the form of a shopping basket or tray 12. The trolley 10 also includes an undercarriage 14.

The tray 12 has a rectangular base 16 from which a low peripherally extending side wall 18 rises, to form a shallow storage space 20. The tray 12 is a moulded unit of a thermoplastic material.

The shopping trolley 10 includes a pair of durable bags 22, 24 (not shown in FIG. 2) which are snugly received in the storage space 20. The bags 22, 24 form a permanent part of the trolley 10, being removable or detachable from the tray 12 and being intended for repeated use. The bags 22, 24 are of a woven flexible plastics textile material. One of the bags 22 is divided into four elongated cylindrical compartments 26 of equal size, the shape and size of the compartments 26 being suitable for holding conventional two litre cool drink bottles and the lengthwise direction of the compartments 28 being upright. The walls of this bag 22 are insulated, so that the bag 22 provides insulated storage compartments 26.

The other bag 24 is divided into two chambers 28 of equal size. Each bag has a closure mechanism in the form of a slide fastener or zip 30, for openably closing the bags 22, 24. Both bags 22, 24 are substantially fluid-tight when they are closed. It should be appreciated that the size and shape of the storage chambers will vary from region to region or country to country to suit the preferences of users in the various regions where the trolleys 10 are used.

Although not shown in the drawings, each bag 22, 24 is provided with a handle for facilitating carrying thereof.

In another embodiment of the invention, which is not illustrated, the storage space 20 of the tray 12 is divided into compartments, so that the shopping trolley 10 does not include the bags 22, 24. In use, articles of shopping can be stored directly in these compartments of the tray 12.

The undercarriage 14 is operable between an erected condition (FIG. 1) in which the undercarriage 14 supports the tray 12 at a working height above the ground 32 on a set of wheels 34, and a collapsed condition (FIGS. 2 and 3), in which the trolley 10 is sufficiently compact to fit into a boot or trunk 50 (FIG. 5) of a passenger sedan 52. In the erected condition (FIG. 1) the undercarriage 14 thus supports the tray 12 at the usual shopping trolley height, i.e. about 0.6 metres or more from the ground 32, the storage space 20 of the tray 12 facing and opening upwardly.

The undercarriage 14 comprises two independently erectable halves 36, each half 36 comprising a U-shaped handle frame 38 and a pair of wheel struts 40, each handle frame 38 being pivotally displaceable relative to the associated wheel strut 40 about a pivot axis 42 which is parallel to the base 16 of the tray 12, and extends normally to the fore-and-aft direction of the trolley 10. In the erected condition of the undercarriage 14, the handle frames 38 are pivotally spaced from the associated wheel struts 40, while, in the collapsed condition, each handle frame 38 lies flat against the associated wheel struts 40. It should be appreciated that although each handle frame 38 is aligned with an opposed pair of wheel struts 40 when the undercarriage is in its erected condition (FIG. 1), this alignment is coincidental, and the handle frames 38 and wheel struts 40 could indeed be misaligned.

Figure 2:
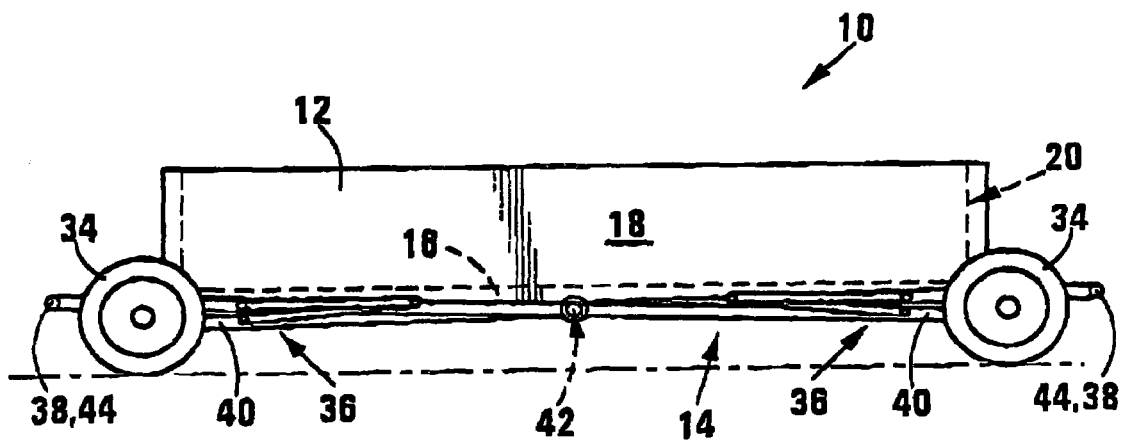
FIG. 2 is a view corresponding to FIG. 1, the undercarriage being in a collapsed condition.
Figure 3:
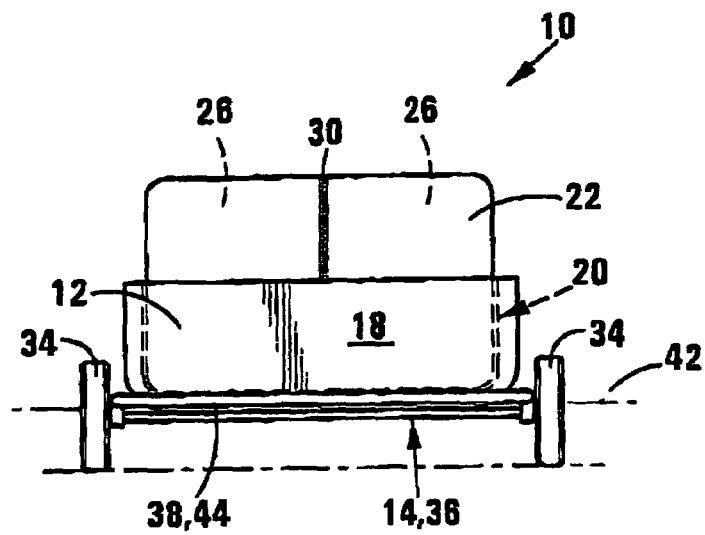
FIG. 3 is a schematic end elevation of a shopping trolley of FIG. 1, the undercarriage being in its collapsed condition.

In the erected condition, each handle frame 38 forms a handle 44 for facilitating pushing of the shopping trolley 10. Although not shown in detail, each wheel 34 is in the form of a castor which is freely swivelable about an upright swivel axis, so that the trolley 10 can be pushed with equal ease from either end of the trolley 10. As the halves 36 of the undercarriage 14 are independently collapsible, the shopping trolley 10 can be operated wheelbarrow-fashion when one of the halves 36 is erected and the other half 36 is collapsed. The undercarriage 14 is provided with a locking mechanism (not shown) for independently locking each half 36 in either an erected condition or a collapsed condition, to permit locking of the undercarriage in wheel-barrow format. In a development of the invention, the locking mechanism is operable by means of push buttons located on each of the handle frames 38. Furthermore, as can be seen in FIG. 2, when the trolley 10 is in its collapsed condition, the wheels 34 protrude from the rest of the undercarriage 14 a sufficient distance to permit wheel-barrow-fashion operation of the trolley 10 when the undercarriage 14 is completely collapsed.

Figure 4:
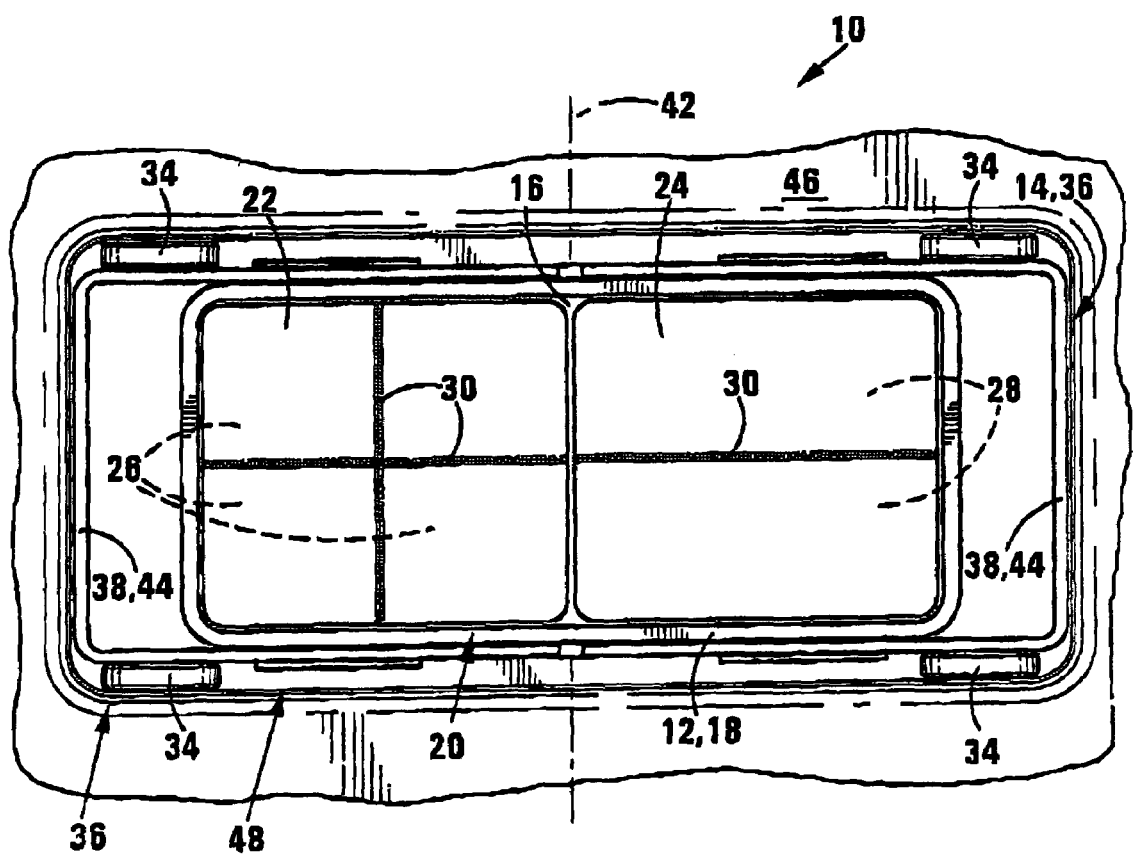
FIG. 4 is a schematic plan view of the shopping trolley of FIG. 1 in a boot or trunk of a passenger sedan.
Figure 5:
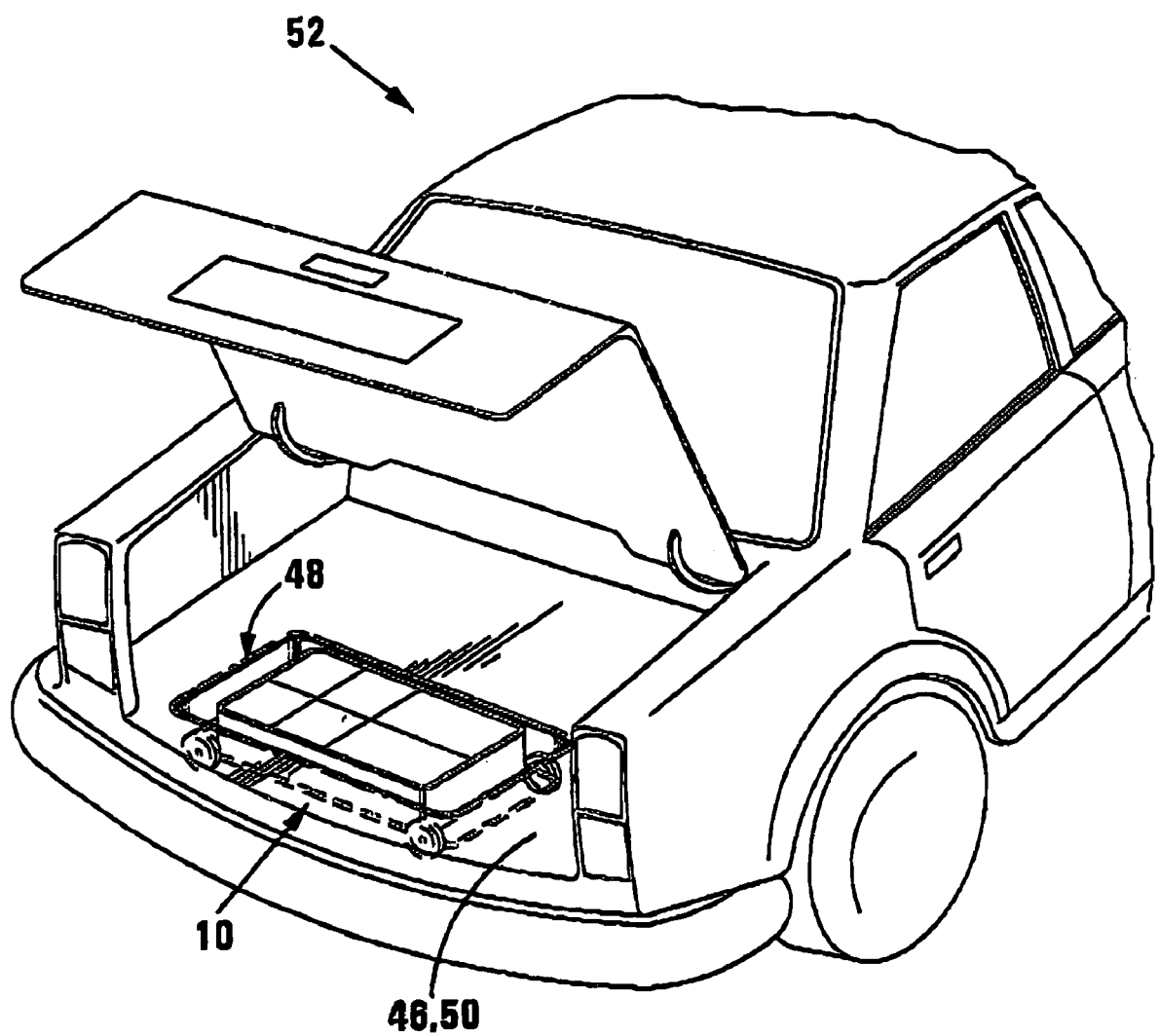
FIG. 5 is a schematic three-dimensional view of a vehicle assembly in accordance with the invention, the assembly including a vehicle and the shopping trolley of FIG. 1.

FIG. 4 shows a part of a floor 46 of the boot 50 of the passenger sedan 52, the shopping trolley 10 being supported on the floor 46 in its collapsed condition. As can be seen in FIGS. 4 and 5, the floor 46 has a securing formation in the form of a depression 48 which is complementary in outline to the underside of the shopping trolley 10 in its collapsed condition, so that the shopping trolley 10 is snugly received in this depression 48. The shopping trolley 10 is thus held and located in a stable condition in the boot 50 during normal operation of the vehicle 52.

In use, the shopping trolley 10 is stored in the boot 50 of the vehicle 52 during normal operation of the vehicle 52, the trolley 10 being held in a stable condition by the expression 48 in the floor 46 of the boot 50. In this condition, the shopping trolley 10 serves as a boot divider, or trunk organizer, providing a number of compartments 26, 28 for storing goods in a stable manner.

When a user (not shown) goes into a shop to do shopping, the shopping trolley 10 is removed from the boot, and the undercarriage 14 is displaced into its erected condition by pivotally displacing the handle frames 38 away from the wheel struts 40, the undercarriage 14 automatically locking in its erected condition. The shopping trolley 10 is then used in a manner similar to conventional shopping trolleys, by pushing the trolley 10 to a shop where articles are to be bought, steering the trolley 10 between the aisles of the shop, and placing articles which are to be bought into the tray 12. After the articles of shopping have been checked out in the usual manner, the bought articles are placed in the bags 22, 24 in the tray 12, and the trolley 10 is pushed back to the vehicle 52. Thereafter, the undercarriage 14 is collapsed, and the shopping trolley 10, with the bought articles still carried by the bags 22, 24 in the tray 12, is placed in the boot. Naturally, articles which should preferably be kept cool, are placed in the insulated chambers 26.

It is envisaged that the undercarriage 14 can be constructed such that it is automatically collapsible upon pushing thereof into contact with the boot 50 of the vehicle 52. To this end, it is expected possibly to be necessary to build the rear end of the vehicle 52 specifically to form a landing for such an automatically collapsible shopping trolley, when a lid of the boot 50 is open. This landing can include a roller rotatably mounted on the vehicle, to facilitate sliding of the trolley into the boot 50.

The user can then drive back to the user's home, the trolley 10 being kept stable in the boot 50 as described above. At home, the user hoe the option of removing the trolley 10 from the boot, erecting the undercarriage 14, and pushing the trolley 10 to a desired location, or the user can remove the bags 22, 24 and carry them to the desired location.

Figure 6:
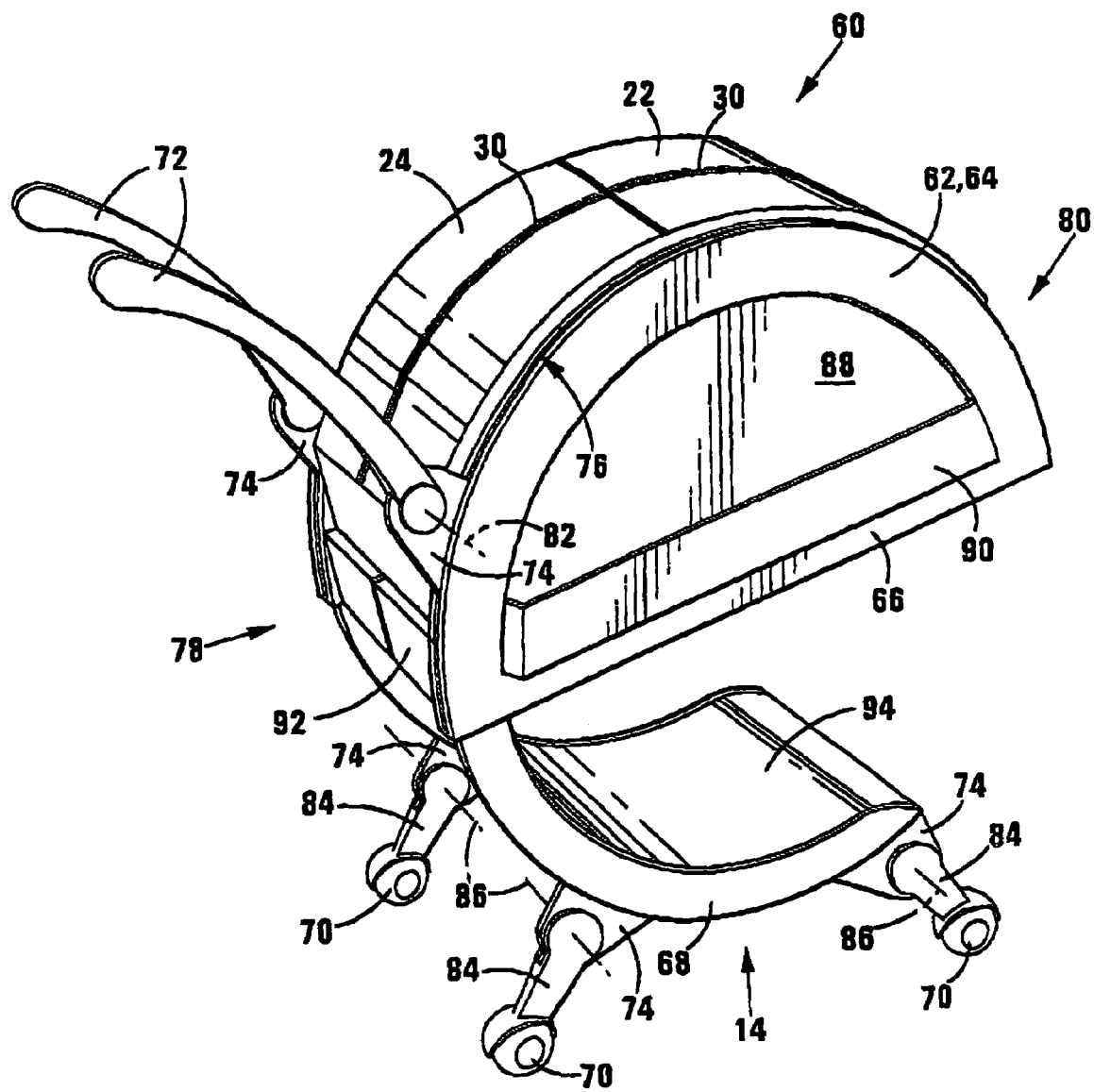
FIG. 6 is a schematic three-dimensional view from behind of a further embodiment of a shopping trolley in accordance with the invention, the undercarriage of the trolley being in an erected condition.
Figure 7:
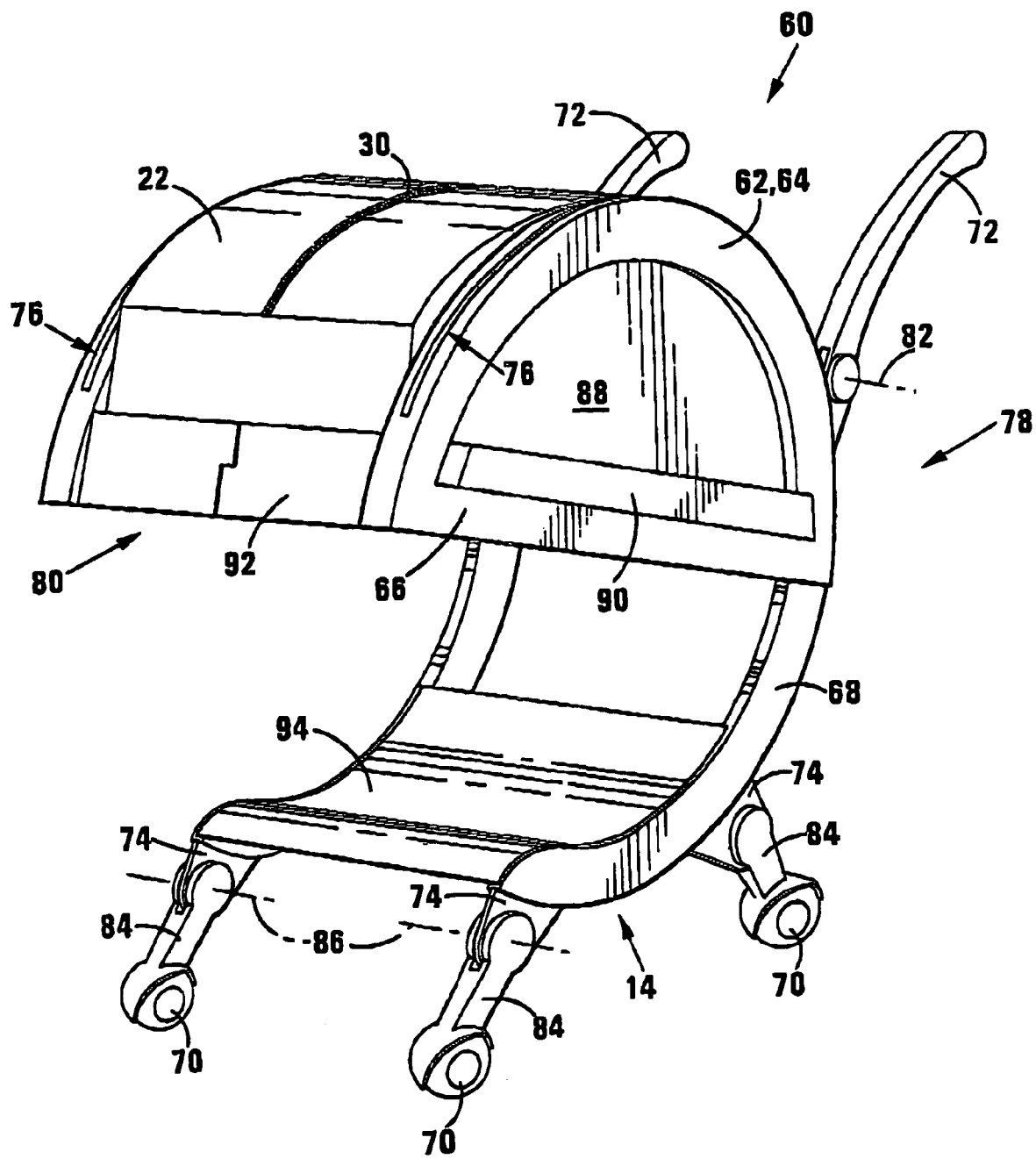
FIG. 7 is a three-dimensional view from the front of the shopping trolley of FIG. 6.
Figure 8:
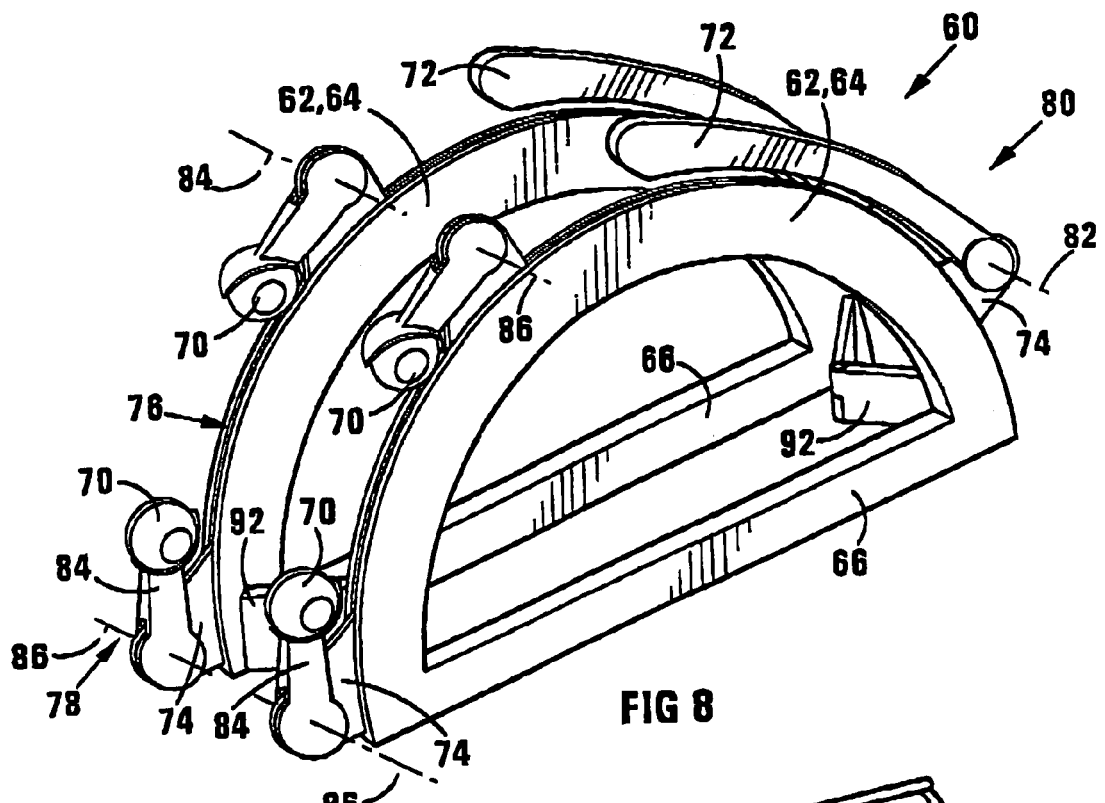
FIG. 8 is a three-dimensional view of the shopping trolley of FIG. 6, shown in its fully collapsed condition.

In FIGS. 6-8, reference numeral 60 generally indicates a further embodiment of a shopping trolley in accordance with the invention, like reference numerals indicating like parts in FIGS. 1-5 and FIGS. 6-8. The shopping trolley 60 functions in a manner similar to the shopping trolley 10 of FIG. 1 but has a different construction and is thus collapsible and extendable in a different manner.

The shopping trolley 60 has two semi-circular or generally bow-shaped frame members 62 which lie in parallel planes and which are transversely spaced apart, said planes being parallel to the fore-and-aft direction of the trolley 60. A bow 64 of each frame member 62 is a hollow tube having a rectangular cross-section. The ends of each bow 64 is connected together by a strut 66 for rigidity.

An elongate curved leg 68 is received in each frame member 62, the leg 68 having a radius of curvature equal to that of the bow 64 of the associated frame member 62, and having a slightly smaller rectangular cross-section, so that each leg 68 is longitudinally telescopically slidable in the associated bow 64. Each leg 68 is thus displaceable between a retracted position (FIG. 8) in which the leg 68 is fully received within the bow 64, and an extended position (FIGS. 6 and 7) in which the leg 68 projects from the frame member 62, being arranged more or less end-to-end with the associated bow 64. Although not shown, the trolley 60 has an automatic locking mechanism for automatically locking the legs 68 in their extended positions.

Each leg 68 has mounted thereon two wheels 70 and a handle 72, the respective wheels 70 and the handle 72 being spaced apart along the length of the leg 68. As can best be seen in FIGS. 6 and 8, each of the wheels 70 and the handles 72 is mounted the associated log 68 by means of a mounting formation in the form of a mounting plate 74 which projects transversely from the leg 68 away from the associated frame member 62, i.e. radially away from leg 68. Each bow 64 has a longitudinally extending slot 76 in a radially outer wall thereof, so that the mounting plates 74 of each leg 65 are longitudinally slidable along the associated slot 76 upon telescopic retraction or extension of the leg 68.

Thus, when one of the legs 68 is fully extended (FIG. 6), the pair of wheels 70 mounted thereon projects downwardly from the body of the trolley 60 provided by the frame members 62, so that the legs 68 together form an undercarriage 14 for supporting the frame members 62 on the ground on wheels 70. In this position, the handles 72 are located at a rear 78 of the trolley 60 in the fore-and-aft direction thereof, for gripping by a user to push the trolley 60 along. However, when the legs 68 are in their retracted positions (FIG. 8), the wheels 70 are located operatively above the bows 64, the handles 72 being positioned adjacent a front 80 of the frame member 62, opposite the rear 78 of the trolley 60.

Each handle 72 is pivotally mounted on its associated mounting plate 74 for pivoting about a pivot axis 82 which extends in a direction normal to the fore-and-aft direction of the trolley 60. Each handle 72 is thus displaceable between an operative position (FIGS. 6 and 7) in which it projects transversely, more or less radially from the associated frame member 62 for gripping by a user, and a stowed position (FIG. 8) in which the handle 72 lies adjacent the bow 64 of the associated frame member 62, extending in a circumferential direction. As can be seen in FIG. 8, the handles 72 are curved in a manner similar to the frame members 62, so that in its stowed position, each handle 72 hugs the curve of the associated bow 64. In this example, each handle 72 is about 0.4 m long. Although not shown in the drawings, each handle 72 is provided with an associated automatic locking mechanism for automatically locking it in its operative position. In other embodiments of the invention, each handle can have a grip which projects transversely from an elongate curved main portion of the handle, the grip being located at an end of the handle remote from its pivotal connection to the associated leg 68, projecting in a direction away from the frame member 62.

Similarly, each wheel 70 is mounted on the associated mounting plate 74 by means of a elongated foot 84. Each foot 84 is pivotally displaceable relative to the associated mounting plate 74 about an associated pivot axis 86 which extends in a direction normal to the fore-and-aft direction of the trolley 60. Each foot 84 is thus displaceable between an operative position (FIGS. 6 and 7) in which it projects transversely, i.e. radially, away from the associated leg 68 for engagement with the ground, and a stored position, in which it is pivoted towards the associated frame member 62, to lie adjacent and more or less parallel to a corresponding part of the associated bow 64, extending more or less circumferentially. As can be seen in FIG. 8, the feet 84 of each leg 68 pivot in opposite directions towards their stored positions, towards each other, so that no part of the leg 68, the wheels 70, or the handle 72 projects in a circumferential direction beyond the ends of the bow 64 of the associated frame member 62. Although not shown in the drawings, each foot 84 is provided with an associated automatic locking mechanism for automatically locking in its operative position. Each wheel 70 is a multi-directional ball mounted on an end of the associated foot 84 opposite the pivot axis 86 of that foot 84, to provide multi-directional movement of the trolley 60.

The radius of curvature of the bows 64 and the legs 68 is about 0.4 m, and the length of each foot 84 is about 150 mm. The length of the struts 66 is thus about 0.8 m. Thus, when erected, the height of the tops of the bows 64 from the ground is about 0.95 m, while the height of the struts 66, which define the height at which the bags 22, 24 are spaced from the ground, is about 0.55 m. When collapsed, the height and length of the trolley 60 are respectively somewhat more than 0.4 m.

Each frame member 62 includes a side panel 88 which closes off a semi-circular opening defined by that frame member 62. Each side panel 88 also provides a longitudinally extending narrow tray 90 which is laterally spaced from the frame member 62 for receiving miscellaneous articles such as pens or note pads.

Figure 9:
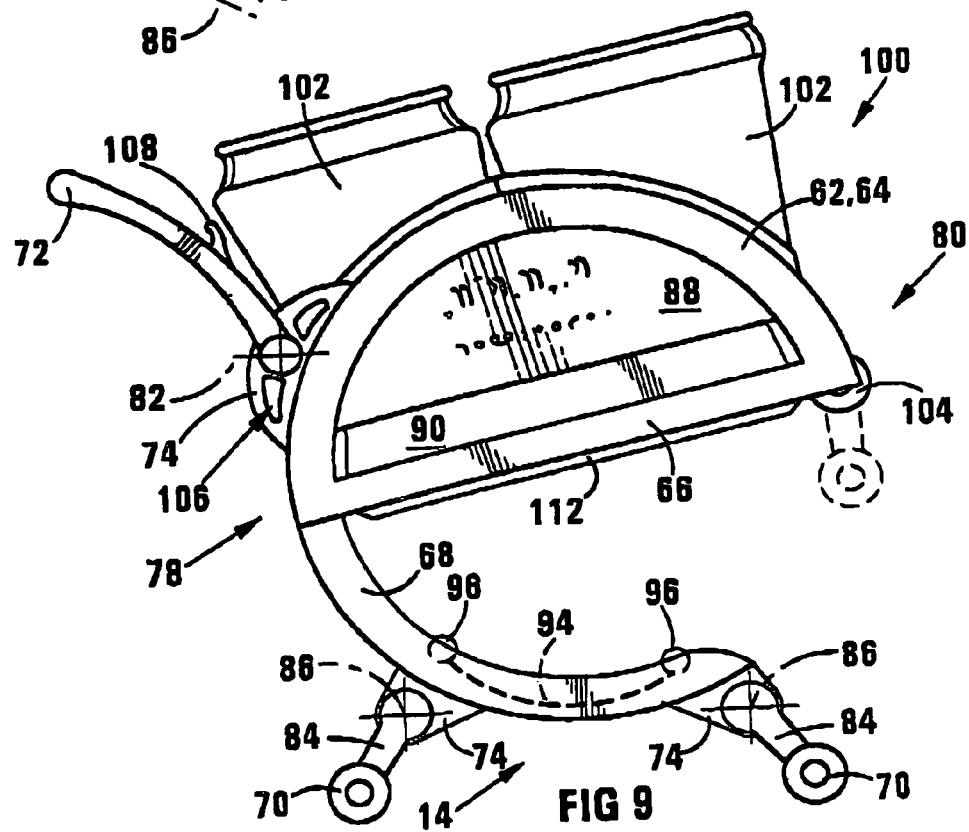
FIG. 9 is a schematic side elevation of yet a further embodiment of a shopping trolley in accordance with the invention.

In the erected condition of the trolley 60, i.e. when both legs 68 are in their extended positions, there is defined a gap between the distal ends of the legs 68 and ends of the bows 64 at the front 80 of the trolley 60, so that the trolley 60 is shaped like a lower case letter e, when viewed in side view (best seen in FIG. 9).

A storage space defined between the frame members 62 houses a pair of flexible fabric bags 22, 24, similar to those described with reference to FIGS. 1-4, the bags 22, 24 being shaped such that upper sides thereof follow the curvature of the frame members 62. The bags 22, 24 are removable and replaceable, similar to the construction described with reference to FIGS. 1-4. The frame members 62 thus together define a holder for holding articles of shopping, via the bags 22, 24. The tops of the bags 22, 24 are generally curved, to follow the curvature of the bows 64, but the bags 22, 24 can be extended vertically to receive overflow items when required, similar to a pair of bags 102 in FIG. 9.

The frame members 62 are laterally displaceable relative to each other, being connected together by a pair of laterally extending collapsible struts 92, one of the struts 92 being located at the front 60 of the trolley 60 and the other strut 92 being located at the rear 78 of the trolley 60. The frame members 62 are thus displaceable between a fully collapsed condition of the trolley 60, in which the struts 92 are collapsed, being folded in articulated fashion, so that the parallel planes in which the frame members 62 lie are located adjacent each other, and an erected condition in which the frame members 62 are transversely spaced apart sufficiently to receive the bags 22, 24 in an expanded condition therein. The fully collapsed condition of the trolley 60 is shown in FIG. 8, the bags 22, 24 and the side panels 88 having been removed for ease of illustration. It will be appreciated that the bags 22, 24 are indeed removable and can be removed in order to facilitate easy collapsing of the frame members 62. Each lateral strut 92 is about 0.4 m long when extended.

The trolley 60 includes an auxiliary holder in the form of a tray 94 provided between the legs 68 when they are in their extended positions (FIGS. 6 and 7). The tray 94 is removable and replaceable and is intended for the storage of bulky goods. In the example shown in FIGS. 6 and 7, the tray 94 comprises a flexible canvas base 96 stretched between two cross-bars (not shown in FIGS. 6 and 7 but schematically indicated in FIG. 9 by reference numeral 96), the cross-bars 96 being connected to both legs 68 to extend transversely between them. The cross-bars 96 thus function as stabilizers for enhancing lateral rigidity of the trolley 60 in its erected condition.

In use, the trolley 60 is used in a manner similar to the trolley 10 described with reference to FIGS. 1-5. During normal use, the trolley 60 is located in the boot of a vehicle in a semi-collapsed condition (not shown). This semi-collapsed condition corresponds to the fully collapsed condition shown in FIG. 8, except that the lateral struts 92 are extended, so that the frame members 82 are laterally spaced apart sufficiently for the bags 22, 24 to be expanded. In this condition, the struts 66 of the frame member 62 provide a stable base on which the trolley 60 rests on the floor of the boot, so that the trolley 60 functions as a boot divider or organizer. In this condition the removable tray 94 comprising the pair of cross-bars 96 and the canvas is folded up and is stored in the lateral tray 90 provided by one of the side panels 88. The trolley 60 is stored in the vehicle such that the fore-and-aft direction of the trolley 60 is aligned with the fore-and-aft direction of the vehicle.

When the trolley 60 is to be removed from the boot, either at a shop, or at home, a user grips the bows 64 of the frame members 62 and pulls the trolley 60 towards an open end of the boot, such that the rear 78 of the trolley 60 projects beyond the rear of the vehicle, the frame members 62 still resting on the boot of the vehicle. The user then reaches over, grips the handles 72, and pulls them towards the open end of the boot, to slide the legs 68 along the bows 64, thus telescopically extending the legs 68. The legs 68 thus move in a circumferential direction around the rear of the vehicle, such that the legs 68 project beneath the vehicle for engagement of the wheels 70 with the ground, the gap formed at the front 80 of the trolley 60 straddling the rear of the vehicle. The handles 72 are pivoted away from the frame members 62 and automatically locked in position, after which the trolley 60 is withdrawn from the boot of the vehicle and is used for shopping in the manner described above with reference to the trolley 10 of FIGS. 1-5. After shopping has been completed, the process is reversed, to position the trolley 60 in the boot in its semi-collapsed condition. In other words, the trolley 60 is wheeled towards the boot of the vehicle (which is open), so that the gap at the front 80 of the trolley 60 straddles the rear of the vehicle, the frame members 62 resting on the boot, after which the legs 68 are telescopically retracted into the associated bows 64. It is envisaged that, in a development of the invention, the extension and/or retraction of the legs 68 can be automated, for instance being activated by a hydraulic, pneumatic, or electro-mechanical actuating means. Such an actuating means can for instance be powered by a standard battery of the vehicle.

If more space in the boot is required, i.e. when no boot organizer is needed, the trolley 60 can be removed from its complementary depression (not shown) in the floor of the boot and the lateral struts 92 are collapsed to displace the frame members into a fully collapsed compact condition (FIG. 8). In this fully collapsed condition, the trolley occupies less space than in its semi-collapsed condition.

In FIG. 9 of the drawings, reference numeral 100 generally indicates a further embodiment of a shopping trolley in accordance with the invention, like reference numerals indicating like parts in FIGS. 6-8 and in FIG. 9. The shopping trolley 100 functions in a manner largely similar to the shopping trolley 60 of FIGS. 6-8, with the main distinctions set out below.

The shopping trolley 100 has a pair of bags 102 which have transparent plastics walls and rigid tray-like bases. Although not shown in the drawings, the bags 102 have multi-purpose partitioned compartments and hook-and-loop type fasteners for closing separate lids for separate compartments defined by the bags 102. Each bag 102 also has a rigid handle for facilitating removal and handling of the bag 102.

The trolley 100 is also provided with an auxiliary wheel 104 at an end of the strut 66 of each frame member 62 at the front 80 of the trolley 100. The auxiliary wheel 104 is extendable to project operatively downwardly from the associated frame member 62, to permit wheelbarrow-fashion operation of the trolley 100 when in its semi-collapsed condition, i.e. when the legs 68 are retracted, by gripping of the rear 78 of the trolley 100 by an user. The auxiliary wheel 104 is shown in its extended position in shadow lines in FIG. 9, and is mounted on a small leg which permits the scaling of stairs by the trolley 100 when a user drags the trolley 100 wheelbarrow-fashion behind the user. Although not shown in the drawings, the lateral strut 92 at the rear 78 of the trolley 100 has handle openings for facilitating gripping of the trolley 100 during such wheelbarrow-fashion operation.

FIG. 9 also shows gripping openings 106 in the mounting plates 74 of the handles 72, to facilitate displacement of the legs 68 during extension or retraction of the legs 68. The handle 72 is also provided with a push button 108 for unlocking of the handle 72 when it is in its operative position.

The trolley 100 is furthermore provided with base strips 112 which extend along underneath surfaces of the struts 66 of the frame members 62, the base strips 112 being of a material having a low coefficient of friction, such as TEFLON, to facilitate sliding of the trolley 100 into the boot of the vehicle, and also to protect the vehicle against damage during such sliding movement. The frame members 62 and the legs 68 are of a moulded thermo-plastics polymeric material.

An additional feature of the trolley 100 of FIG. 9, is that advertising material is provided on the laterally outwardly directed surface of the side panel 88.

It is an advantage of a shopping trolley 10, 60, 100 as described with reference to the drawings, that it provides for convenient transportation of articles of shopping from a point of purchase to the home of the user. In contrast to conventional shopping methods, it is not necessary for the user to find a functioning shopping trolley at the shop, to pack the bought articles into thin-welled flexible plastic bags at the checkout point, to load these shopping bags into the boot of the vehicle, to unload the bags from the boot of the vehicle, and to carry them to the desired location. Consequently, at least the step of unloading shopping bags from a conventional shopping trolley into the boot of the vehicle is eliminated, and, if the shopping trolley 10, 60, 100 is used to convey the bought articles from the vehicle to the desired location, the step of unloading the shopping bags from the boot of the vehicle is also eliminated.

The embodiments of the trolley 60, 100 of FIGS. 6-9 has the additional advantage that erection and collapsing of the trolley 60, 100 is facilitated by partial support of the trolley 60, 100 on the vehicle during such erection or collapsing.

Repeated use of the durable bags 22, 24 should alleviate the environmental impact of conventional shopping bags of thin plastics sheet material.

The trolley 10, 60, 100 also provides a convenient way of transporting articles from the home to the shop, for instance empty bottles which are to be returned. When a small quantity of shopping is to be bought, a user has the option of removing one of the durable bags from the trolley 10, 60, 100, leaving the trolley 10, 60, 100 in the vehicle, and using the bag to carry articles of shopping from the shop to the vehicle, where the bag is returned to the trolley 10, 60, 100.

It is, of course, a further advantage of the invention that, while not in use as a shopping trolley, the shopping trolley 10, 60, 100 conveniently provides a boot organizer. Also, the closure mechanisms 30 of the bags 22, 24 can prevent potential harm to occupants of a vehicle having no partition between the boot and the passenger compartment of the vehicle, owing to airborne articles of shopping during an accident.

In a development of the invention, which is not shown, an electronic computer can be mounted on a mounting therefor provided on the trolley 10, 60, 100. The computer can be used to store a list of items to be bought, and it is envisaged that the computer can have an interface to a computer system of a shop where articles are to be bought, for downloading information about these articles, such as their price and their location in the shop. Naturally, the computer will be located in an easily accessible manner in the trolley 10, 60, 100.

The tray 12 or the frame members 62 can also be provided with hooks for holding additional shopping bags, and the tray 12 of the embodiment of FIGS. 1-4 can have integrally moulded handles for facilitating carrying or storage of the tray 12, e.g. for carrying thereof in the fashion of a suitcase or for manoeuvring it in a vehicle's boot.

It is also a feature of the invention that it can easily be made of recycled or recyclable materials; and that it can be branded and/or styled to match particular makes and/or colours of vehicles. This is particularly the case with the embodiments of FIGS. 6-9, where advertising material or branding can be provided on the side panels 88.

It is also expected that the invention can form a link between pantry and supermarket, while reducing the unnecessary use of disposable carrier bags. Instead, if desired, it can be left in the boot and its durable bags can be carried between it and the supermarket on the one hand, and between it and the pantry on the other.

The invention claimed is:

1. A shopping trolley, comprising:
  a holder for holding articles of shopping; and
  a wheeled undercarriage connected to the holder, the undercarriage being operable between an erected condition, in which the undercarriage supports the holder at a working height above the ground on wheels, and a collapsed compact condition, for loading of the trolley into a boot of a passenger sedan,
  the undercarriage comprising a pair of elongate curved legs, each leg being part-circular in shape and slidably mounted on an associated frame member also having a part-circular shape corresponding to the shape of the leg, to permit telescopic sliding of the legs in a circumferential direction between an extended position in which each leg projects from its associated frame member for engagement of the wheels with the ground, and a retracted position in which each leg is located within its associated frame member.

2. The shopping trolley as claimed in claim 1, which is supportable on a floor of a vehicle boot, when the undercarriage is in its collapsed condition, such that the holder has an orientation relative to the vertical similar to the orientation of the holder when the undercarriage is in its extended condition and supports the holder on the ground, so that the holder provides a boot organizer.

3. The shopping trolley as claimed in claim 2, wherein spacing of the holder from the ground surface, when the undercarriage is in its erected condition, is such that the holder is accessible to a person of average height in normal stance, the spacing being greater than 0.45 m.

4. The shopping trolley as claimed in claim 1, wherein the holder defines a storage space which is divided into a number of compartments.

5. The shopping trolley as claimed in claim 1, wherein the undercarriage has a set of four wheels which are arranged in a rectangular configuration in plan view, when the undercarriage is in its erected condition, each roller being freely swivelable about an associated upright swivel axis.

6. The shopping trolley as claimed in claim 1, wherein each leg has mounted thereon a displaceable handle such that, when the leg is in its extended position, the associated handle is located adjacent a rear of the trolley, in its fore-and-aft direction, for gripping by a user, each handle being pivotally displaceable relative to the associated frame member about a pivot axis which extends transversely to the fore-and-aft direction of the trolley in its erected condition, so that, when the leg is in its retracted position, the handle is pivotally displaceable about its pivot axis towards the associated frame member to lie adjacent the frame member.

7. The shopping trolley as claimed in claim 1, wherein each leg has mounted thereon a pair of wheels spaced along the length of the leg, each wheel being spaced from the associated leg by an elongate foot which is pivotally connected at one end thereof to the leg for pivotal displacement about a pivot axis which extends transversely to the fore-and-aft direction of the shopping trolley, an associated wheel being provided at the opposite end of the foot, each foot being pivotally displaceable between a stowed position in which it lies adjacent the associated leg, and an operative position in which it projects transversely from the associated leg, so that the associated wheel is spaced from said leg by the length of the foot for engagement with the ground.

8. The shopping trolley as claimed in claim 1, wherein each part-circular leg and its associated part-circular frame member, in the erected condition of the undercarriage, lie in a more or less vertical plane and define a gap between their ends at a front of the trolley in the fore-and-aft direction of the shopping trolley, said gap being sufficiently large to straddle a rear portion of an open boot of a passenger sedan when the shopping trolley is wheeled towards the boot of the vehicle, in use, so that part of the legs is receivable in a space between the ground and the rear of the vehicle, the frame members engaging the rear of the vehicle, to rest thereon.

9. The shopping trolley as claimed in claim 1, comprising an auxiliary holder for holding articles of shopping, the auxiliary holder being removably and replaceably connectable to the legs to extend between the legs when they are in their extended positions, the auxiliary holder additionally serving as a strengthening cross-member between the legs to enhance lateral stability of the undercarriage.

10. The shopping trolley as claimed in claim 1, comprising a pair of auxiliary wheels which are respectively mounted on the frame members adjacent ends of the frame members in the fore-and-aft direction of the trolley, such that the auxiliary wheels are engageable with the ground when the extendable legs are in their retracted positions and an end of the trolley opposite the auxiliary wheels is gripped by a user, to permit wheelbarrow-fashion operation of the trolley.

11. A vehicle assembly, comprising:
  a shopping trolley as claimed in claim 1; and
  a vehicle which includes a body defining a boot, the boot having a securing arrangement specifically for securing the shopping trolley in a stable condition in the boot during normal operation of the vehicle, the shopping trolley being supported with its undercarriage in its collapsed condition on a floor of the boot of the vehicle and being secured in a stable condition by the securing arrangement provided by the vehicle.

12. The shopping trolley as claimed in claim 3, wherein the spacing of the holder from the ground surface, when the undercarriage is in its erected condition, is 0.5-0.6 m.

13. The shopping trolley as claimed in claim 4, comprising a number of durable shopping bags which are receivable in a storage space of the holder, the bags forming a permanent part of accessory, being removable from the holder and being intended for repeated use.

14. The shopping trolley as claimed in claim 13, wherein the bags are of a woven flexible textile material.

15. The shopping trolley as claimed in claim 13, wherein at least some of the bags are insulated to provide thermally insulated storage chambers.

16. The shopping trolley as claimed in claim 13, wherein at least one of the bags has a closure mechanism for openably closing the bags.

17. A shopping trolley, comprising:
a holder for holding articles of shopping; and
a wheeled undercarriage connected to the holder, the undercarriage being operable between an erected condition, in which the undercarriage supports the holder at a working height above the ground on wheels, and a collapsed compact condition, for loading of the trolley into a boot of a passenger sedan,
the undercarriage comprising a pair of elongate curved legs, each leg being part-circular in shape and slidably mounted on an associated frame member between an extended position in which each leg is arranged end-to-end with its associated frame member for engagement of the wheels of that leg with the ground, and a retracted position in which each leg is retracted relative to its associated frame member, wherein the pair of frame members are displaceable relative to each other between an operative condition in which the frame members lie in parallel planes which are laterally spaced apart in a direction transverse to the fore-and-aft direction of the shopping trolley a sufficient distance to permit temporary storage of articles of shopping in a space defined between the frame members, and a fully collapsed condition in which the frame members lie more or less flat against each other.

* * * * *

UNITED STATES PATENT AND TRADEMARK OFFICE
CERTIFICATE OF CORRECTION

PATENT NO. : 7,427,080 B2
APPLICATION NO. : 10/519235
DATED : September 23, 2008
INVENTOR(S) : Naude et al.

It is certified that error appears in the above-identified patent and that said Letters Patent is hereby corrected as shown below:

Claim 3, Column 11, Line 63:

change "as claimed in claim 2" to -- as claimed in claim 1. --

Signed and Sealed this

Eighth Day of December, 2009

David J. Kappos
*Director of the United States Patent and Trademark Office*